United States Patent [19]
Pike et al.

[11] Patent Number: 4,859,521
[45] Date of Patent: Aug. 22, 1989

[54] COLD-SEAL ADHESIVES AND COMESTIBLE PACKAGES FORMED THEREWITH

[75] Inventors: Charles O. Pike, Reynoldsburg; Tamela A. Viers, Columbus, both of Ohio

[73] Assignee: Century Adhesives Corp., Columbus, Ohio

[21] Appl. No.: 283,492

[22] Filed: Dec. 12, 1988

Related U.S. Application Data

[62] Division of Ser. No. 74,861, Jul. 16, 1987, Pat. No. 4,810,745.

[51] Int. Cl.⁴ .............................................. B32B 3/03
[52] U.S. Cl. .................................... 428/195; 428/187; 428/345; 428/349; 428/355

[58] Field of Search ............... 428/195, 187, 345, 355, 428/349

[56] References Cited

U.S. PATENT DOCUMENTS

| 3,865,664 | 2/1975 | Neumann | 428/486 |
|---|---|---|---|
| 4,076,661 | 2/1978 | Kassner | 524/516 |
| 4,164,614 | 8/1979 | Ames | 428/355 |
| 4,374,948 | 2/1983 | Adams | 524/516 |
| 4,456,741 | 6/1984 | Ames | 428/355 |
| 4,745,140 | 5/1988 | Guswani | 524/516 |

*Primary Examiner*—Edith Buffalow
*Attorney, Agent, or Firm*—Carroll F. Palmer

[57] ABSTRACT

Comestibles are packaged in wrappers formed of plastic film or equivalent sheet material sealed with cold-seal adhesives containing a minor percentage of vinylpyrrolidone/styrene copolymer as a bond enhancement agent.

5 Claims, 1 Drawing Sheet

COLD-SEAL ADHESIVES AND COMESTIBLE PACKAGES FORMED THEREWITH

REFERENCE TO RELATED APPLICATION

This is a division of U.S. patent application Ser. No. 074,861, filed July 16, 1987, now U.S. Pat. No. 4,810,745.

BACKGROUND OF THE INVENTION

1. Field of the Invention

This invention relates broadly to cold-seal adhesives, packages sealed therewith and new methods of forming packages. More particularly, it concerns latex (emulsion) adhesives capable of forming dry adhesive layers on plastic or equivalent film that can then later be pressure bonded together, without the use of heat, to form wrappers about candy or other comestibles.

2. Description of the Prior Art

It is conventional practice to form packages for many products simply by wrapping the product in paper, metal foil, plastic film or other sheet material. Often, in order to complete the packaging, overlapped layers of the wrapper are bonded together in some way, e.g., by crimping, stabling, cementing, etc.

The bonding of sheet wrappers by cementing overlapped layers with some type of adhesive is attractive from the viewpoint of cost savings and package esthetics. However, this can be restrictive as to the choice of the wrapper material if suitable adhesives do not exist for the bonding of certain classes of sheet material. For example, some types of plastic films, such as polyolefin film, are difficult to permanently bond together with adhesive because adhesives to not stick easily to such films.

Also, the type of product being packaged can limit the choice of wrapper material and adhesive. For example, candy and other comestibles require government approved wrapper materials and adhesive ingredients which eliminates many materials available for packaging other type products. Moreover, heat sensitivity of some candy and other comestibles mitigate against the use of heat in effecting the sealing of wrappers about them. Hence, use of cold-seal adhesives, i.e., adhesives that can cement together layers of sheet material without need to apply heat thereto (see U.S. Pat. No. 4,375,383), is extensively used in the wrapper packaging of candy bars and the like.

The present invention provides new improvements in cold-seal adhesives that are particularly useful in the packaging of candy and other comestibles.

OBJECTS

A principal object of the invention is the provision of improved cold-seal latex adhesives capable of being used to permanently bond together layers of high energy treated polyolefin film.

Further objects include the provision of:

1. New methods of packaging candy and other comestibles.
2. New cold-seal adhesives that can bond together layers of polyolefin film with greater bond strength than prior know cold-seal adhesives and that can do this without need to apply a primer to the film.
3. Such adhesives that provide tamper-evident tearing bonds on all major polypropylene films.
4. New forms of comestible wrappers.
5. Cold-seal adhesives possessing good processability on full-scale presses without foaming or blocking problems.
6. Such adhesives which produce cold sealed bonding of polyolefin film that improves with aging, even in the presence of slip agents.
7. New wrapper sealing methods which avoid the need for a primer application thereby freeing up a coating station in full-scale presses for an additional color printing in the packaging operation.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the provision of cold-seal latex adhesives for use in sealing comestibles in wrapper packages which comprise an oil-in-water (o/w) emulsion of the following ingredients in the stated approximate weight percentages:

| | |
|---|---|
| rubber | 25–45% |
| acrylic polymer | 20–25% |
| tackifier | 25–35% |
| vinylpyrrolidone/styrene copolymer | 4–8%. |

Additionally, these adhesives may contain up to about 1% by weight of a surfactant, up to about 1% by weight of a foam inhibitor, up to about 1% by weight of a dispersion stabilizer, up to about 2% by weight of an anti-oxidant and up to about 2% of an antiblocking agent.

The objects are further accomplished by the creation of new packages for candy bars and other comestibles comprising a wrapper of plastic film or equivalent sheet material sealed with an adhesive bond resulting from a cold-seal latex adhesive having a composition as stated above.

Additionally, the objects are accomplished by new methods of packaging comestibles which comprise wrapping a comestible in a corona or other high energy treated polyolefin film, especially polypropylene film, and sealing the comestible in the film by the use of a latex cold-seal adhesive having a composition as stated above.

BRIEF DESCRIPTION OF THE DRAWINGS

A more complete understanding of the invention may be obtained by reference to the accompanying drawings in which.

DESCRIPTION OF THE PREFERRED EMBODIMENTS

Figure 1:
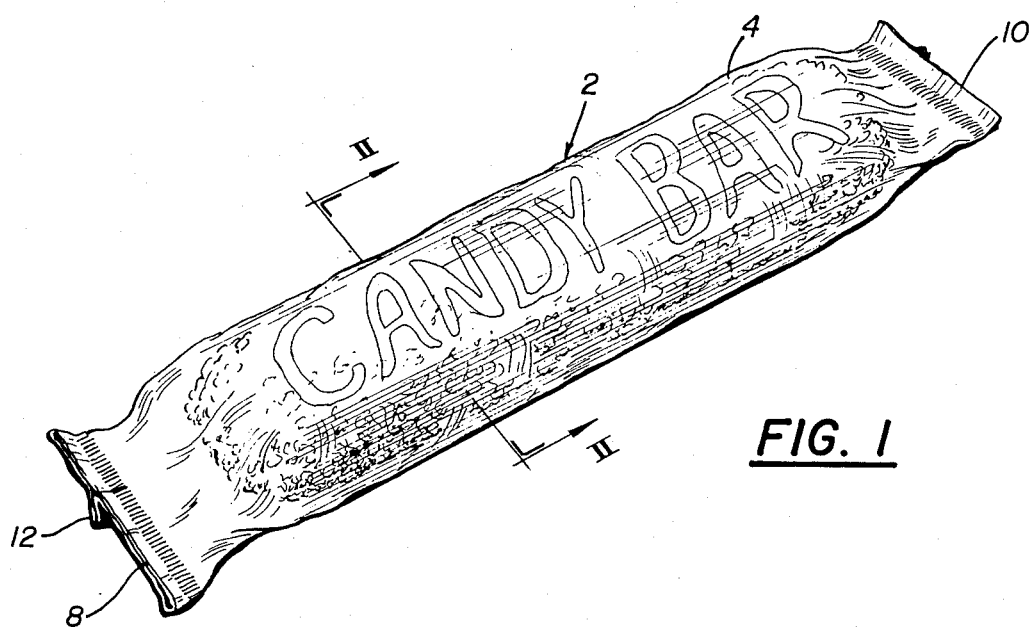
FIG. 1 is a perspective view of a candy bar packaged in accordance with the invention.
Figure 2:
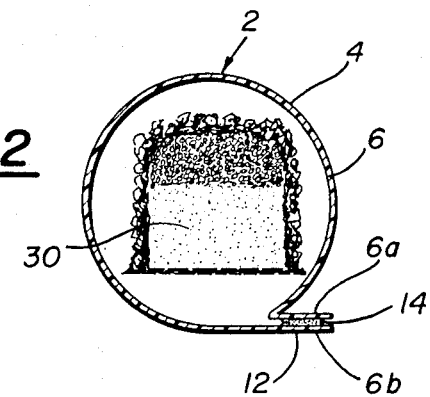
FIG. 2 is a sectional view taken on the line II—II of FIG. 1.
Figure 3:
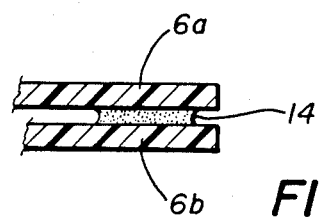
FIG. 3 is an enlarged sectional view of a portion of a bonded joint between overlapped layers of polyolefin film made in accordance with the invention.
Figure 4:
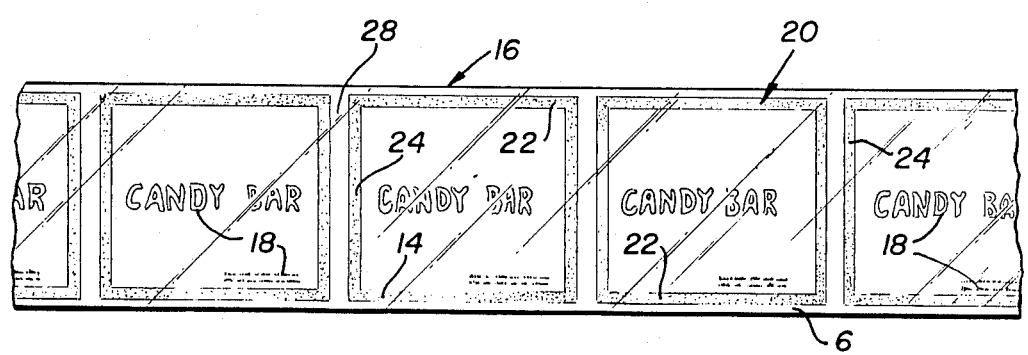
FIG. 4 is a fragmentary, plan view of a sheet of film bearing portions of cold-seal adhesive of the invention applied thereto creating a wrapper material for forming comestible packages in accordance with the invention.

With reference to the drawings, the invention provides new adhesive compositions, package components and methods for the production of comestible packages 2 comprising a wrapper 4 of corona treated polyolefin film 6 having end closures 8 & 10 and longitudinal bottom closure 12. The closures 8, 10 & 12 are each formed of abutted film layers 6a & 6b sealed together with an adhesive layer 14.

The creation of the final packages 2 begins with the production, typically at a coating plant separated from the packaging plant, of a continuous sheet of wrapping material 16. Thus, with the use of conventional, multi-station printing presses (not shown), a corona treated polyolefin film 6 has applied thereto at separate stations (not shown) artwork and text 18 in one or more colors and a layer of adhesive 14 in a predetermined pattern 20 thereby forming the wrapping material 16. The adhesive pattern 20 typically will be rectangular defined by longitudinal stripes 22 and transverse stripes 24.

The adhesive layer 14 is applied to the film 6, usually after the application of the artwork and text 18, by gravure roll application so that the layer 14 has a thickness of about 0.25 to 0.50 mil and consists of a multitude of separated spots or dots, rather than a solid, continuous layer.

The adhesive applied to form the layer 14 is a latex cold-seal adhesive in the form of an o/w emulsion of the following ingredients in the stated approximate weight percentages:

| | |
|---|---|
| rubber | 25–45% |
| acrylic polymer | 20–25% |
| tackifier | 25–35% |
| vinylpyrrolidone/styrene copolymer | 4–8%. |
| surfactant | up to about 1% |
| foam inhibitor | up to about 1% |
| dispersion stabilizer | up to about 1% |
| antioxidant | up to about 2% |
| antiblocking agent | up to about 2%. |

An example of a latex cold-seal adhesive of the invention consists of the following ingredients in the stated solids-dry-weight percentages:

| | |
|---|---|
| Natural rubber latex (62% solids) "GY GNL 150" (Goodyear) | 40% |
| Pentaerythritol rosin ester emulsion "Pentalyn H" (55% emulsion - Hercules) | 30% |
| Acrylic polymer (50% emulsion) "2600 × 288" (Goodrich) | 21.5% |
| vinylpyrrolidone/styrene copolymer "Polectron 430" (40% emulsion - GAF) | 5% |
| Sodium gluconate (antioxidant component) | 0.5% |
| Antioxidant (50% emulsion) "Aquamix 334" (Harwick Chemical Co.) | 0.5% |
| Casein (15% aqueous solution - generic) (dispersion stabilizer an antiblocker) | 0.5% |
| Fatty acid amide (antiblocker) "MichemLube 177" (20% emulsion - Michelman) | 1.0% |
| Non-foaming surfactant "Surfynol 440" (Air Products & Chemicals Inc.) | 0.75% |
| Foam inhibitor surfactant "Foamaster III" (Henkle Corp). | 0.25% |

All the above listed ingredients meet FDA requirements No. 176:170 for use in food wrappers.

The amount of adhesive used in forming the layer 14 for wrapping material 16 will typically be about 0.7 to 1.0 lbs. per 1000 sq. ft. of application. Also, when corona or other surface treated sheet material is used, the adhesive is applied to the treated surface.

As the wrapping material 16 issues from the coating machine (not shown) with the artwork & text 18 and adhesive layer 14 dried, it is rolled into a roll (not shown) for storage and/or transport to a comestible packing plant. At such packaging plant and using conventional form, fill and seal machines (not shown), candy bar packages 2 are produced. To do this, the packaging machine cuts individual wrappers 4 from the material 16 by cutting at a "form" station through the portions 28 of the material 16 between two adjacent transverse stripes 24. Then, the candy bars 30 are placed at a fill station on the cut film 6, after which, at a seal station, the package 2 is formed by face-to-face lapping of stripes 22 and stripes 24 together by pressure and without heat to form the end closure 8 & 10 and the longitudinal closure 12.

In the past, several serious problems have persisted in attempts to provide the packaging industry with acceptable latex cold-seal adhesives including (a) foaming during roller application, (b) blocking (sticking together of layers in rolls of packaging film bearing a layer of the adhesive), (c) lack of "wetting" of the film by the applied layer of latex adhesive and (d) unsatisfactory adherence of the dried cold-seal adhesive layer to the packaging film. The new adhesives of the invention substantially eliminate these problems in the production and use polyolefin packing film in packaging of candy or other comestibles.

In preferred embodiments of the invention, the sheet material used for forming packages is polyolefin film formed by casting, blowing, calendaring, etc., particularly, polyethylene and polypropylene film of about 0.5 to 2 mil thickness that has received a high-energy (34-40 dynes/-grms/sq.cm.) treatment, e.g., corona discharge or flame treatment, on one surface thereof. Film that has received such treatment on both surfaces should be avoided in order to minimize blocking problems in rolls of the adhesive coated package film. However, if film so treated on both surfaces is used, antiblocking agents can be included in the new cold-seal adhesives to mitigate the blocking problem.

Advantageously, the polyolefin film is bidirectionally oriented, e.g., by stretching. Further, the invention is noteworthy for use with film of the "high slip" variety produced by inclusion of a slip agent in its composition since the new cold-seal adhesives of the invention do not require the use of a primer layer in order to "stick" to such film, in contrast to the need for primers to get prior know adhesives to adhere to such film.

In addition to polyolefin film, sheet materials for use in the invention include glassine, metal foil, polyester film, paper, polyvinylidene chloride film, nylon film or equivalent sheet material.

The sheet material can have artwork and text applied in a variety of ways, usually before the application of the cold-seal adhesive. Typically, this will be done using multi-station presses to create direct or reverse printing of the sheet material. In some cases, especially where water based inks are applied, a lacquer overcoat will be applied to the printed artwork and text before the application of the cold-seal adhesive.

Rubber is a major component of the new cold-seal adhesives. Since such adhesive prior to application to sheet material is in the form of an o/w emulsion (latex), it is advantageous to use natural rubber latex, typically containing about 50 to 65% solids by weight, as the source for this component. Alternatively, synthetic rubber latex may be used, e.g., styrene/isoprene/styrene block copolymer latex or similar latex. Examples of usable commercially available S-I-S copolymers include "Europene T 190" (Enichem AMERICAS), "Kraton 1112", "Kraton 1320", and "Kraton 1107" (Shell Chemical Company) and S-B-S copolymers include "Kraton 1101" (Shell) and "Stereon 840A" (Firestone Synthetic Rubber Co.)

Another essential ingredient of the new adhesives is an acrylic polymer, again supplied in the form of an emulsion, typically containing about 40 to 70% solids by weight. A variety of these are commercially available designed for use in pressure-sensitive adhesives, e.g., "2600×288" & "2600×315" (Goodrich). This ingredient provides strength, adhesion and sealing though pressure.

A third essential ingredient of the new adhesives is a tackifier resin, advantageously supplied in the form of an emulsion, typically containing about 40 to 70% solids by weight. Tackifying resins, also called tackifiers, useful in formulating pressure-sensitive adhesives (PS adhesives) are a known class of materials and include polyterpene resins, coumarone-indene resins, hydrogenated hydrocarbon resins, pentraerythritol and other rosin ester resins, hydrogenated rosins and the like brittle type resins, see U.S. Pat. Nos. 3,027,337, 3,787,531 & 3,987,002. Examples of usable commercially available tackifying resins include "Pentalyn H", "Piccolyte C135", "Foral 85" and "Staybellite Ester 10" (Hercules, Inc.), and "Super Nevtac 99" & "Nevtac 130" (Neville Chemical Co.).

A fourth essential ingredient is a vinylpyrrolidone/styrene copolymer. Such material is commercially available in the form of an aqueous emulsion as "Polectron 430" (GAF Corp.).

Optional ingredients are surfactants, foam inhibitors, dispersion stabilizers, antioxidants, and antiblocking agents. All of these are known classes of materials for use in adhesives and are commercially available from a variety of sources under various tradenames.

A preferred surfactant for use in the invention is "Surfynol 440" (Air Products). Additional surfactants include "Surfynol 104", "Igepal 897" & "Igepal 630" (G.A.F. Corp.) and like relatively non-foaming surfactants.

A preferred foam inhibitor for use in the invention is "Foamaster III" (Henkle Corp.). Additional foam inhibitors include "Movidyne PA-456" and like non-silicone products that do not "fish-eye".

A preferred dispersion stabilizer for use in the invention is casein. Additional dispersion stabilizers include polyvinyl alcohol (Dupont), carboxy methylcellulose (Hercules), polyvinyl pyrilodone (GAF) and equivalent water soluble polymeric materials.

A preferred antioxidant for use in the invention is "Aquamix 334" (Harwick Chemical Co.). Other antioxidants useful in the invention include "Irganox 1010" (Ciba-Geigy Corp.), "Ethanox 330" (Ethyl Corp.) and "Borg-Warner 626" & "Borg-Warner TNPP" (Borg-Warner Chemical Co.).

A preferred antiblocking agent for use in the invention is "MichemLube 177" (Michelman Co.). Other antiblockers useful in the invention include stearylamide, behenamide and ethylene bisstearamide. Also, fumed silica is an effective anti-block agent when used in small quantities.

The embodiments of the invention in which an exclusive property or privilege is claimed are defined as follows:

1. A sheet material for packaging of comestibles comprising a continuous film of polyolefin resin that has been corona treated on one surface thereof, which surface has printed thereon in ink artwork and text and also a geometric pattern of cold-seal adhesive containing as an active ingredient between about 4–6% by weight of vinylpyrrolidone/styrene copolymer, rubber 25–45%, acrylic polymer 20–25%, tackifier 25–35%.

2. The sheet material of claim 1 wherein said cold-seal adhesive is the dried residue from the grauve roll application to said film treated surface of a latex having the following composition:

| | |
|---|---|
| rubber | 25–45% |
| acrylic polymer | 20–25% |
| tackifier | 25–35% |
| vinylpyrrolidone/ styrene copolymer | 4–8% |
| surfactant | up to about 1% |
| foam inhibitor | up to about 1% |
| dispersion stabilizer | up to about 1% |
| antioxidant | up to about 2% |
| antiblocking agent | up to about 2%. |

3. A non-blocking roll of the sheet material of claim 1.

4. The sheet material of claim 1 wherein said pattern consists of stripes of said adhesive.

5. The sheet material of claim 4 wherein said stripes form a plurality of separate rectangles spaced apart longitudinally along said film.

* * * * *